United States Patent [19]
Hasebe

[11] Patent Number: 5,783,326
[45] Date of Patent: Jul. 21, 1998

[54] NONAQUEOUS ELECTROLYTE SECONDARY BATTERY

[75] Inventor: Hiroyuki Hasebe, Chigasaki, Japan

[73] Assignee: Kabushiki Kaisha Toshiba, Kawasaki, Japan

[21] Appl. No.: 815,732

[22] Filed: Mar. 12, 1997

[30] Foreign Application Priority Data

Mar. 14, 1996 [JP] Japan .................. 8-057969

[51] Int. Cl.⁶ .................. H01M 10/34
[52] U.S. Cl. .................. 429/57; 429/59; 429/62; 429/94; 429/194; 429/218
[58] Field of Search .................. 429/53, 56, 57, 429/59, 218, 94, 194, 62

[56] References Cited

U.S. PATENT DOCUMENTS 5,609,972  3/1997  Kaschmitter et al. .................. 429/56
5,631,100  5/1997  Yoshino et al. .................. 429/218
5,654,114  8/1997  Kubota et al. .................. 429/218

FOREIGN PATENT DOCUMENTS 5-74493  3/1993  Japan .

*Primary Examiner*—Bruce F. Bell
*Attorney, Agent, or Firm*—Foley & Lardner

[57] ABSTRACT

This invention provides a nonaqueous electrolyte secondary battery including a positive electrode capable of absorbing/desorbing lithium ions, a negative electrode capable of absorbing/desorbing lithium ions, a nonaqueous electrolyte, and a Positive Thermal Coefficient, wherein the Positive Thermal Coefficient satisfies expression (1) below $$50/P < R \qquad (1)$$

where R (m$\Omega$) is the resistance at 25° C. of the Positive Thermal Coefficient and P (Ah) is the nominal capacity of the secondary battery.

11 Claims, 2 Drawing Sheets

NONAQUEOUS ELECTROLYTE SECONDARY BATTERY

BACKGROUND OF THE INVENTION

The present invention relates to a nonaqueous electrolyte secondary battery comprising a Positive Thermal Coefficient (this Positive Thermal Coefficient will be referred to as PTC herein after) having a function of interrupting the current path when an overcurrent is supplied and, more particularly, to a nonaqueous electrolyte secondary battery in which the PTC is improved.

Recently, secondary batteries using nonaqueous electrolytes, e.g., lithium secondary batteries and lithium ions secondary batteries, are beginning to be used extensively as power supplies of portable electronic apparatuses since these secondary batteries have a high energy density and provide a high voltage of 3V or higher when compared to nickel cadmium secondary batteries and nickel metal-hydride secondary batteries.

Unfortunately, when a secondary battery of this type is charged by an overcurrent or an overvoltage (these charges will be collectively referred to as overcharge hereinafter), the battery internal pressure rises due to a chemical change of a positive electrode or a negative electrode constituting an electrode group or decomposition of a nonaqueous electrolyte. This can lead to a leak of the electrolyte or explosion or ignition of the battery.

To prevent this, the following means are conventionally used. That is, a safety valve mechanism prevents explosion of a battery by lowering the battery internal pressure when the battery internal pressure rises. A current interrupting mechanism senses a rise of the battery internal pressure and interrupts an overcurrent which has caused the rise of the battery internal pressure. A PTC or the like senses a rise of the battery temperature and interrupts an overcurrent.

For example, PTC having resistances of about 40 mΩ and about 30 mΩ at 25° C. are used in nonaqueous electrolyte secondary batteries having nominal capacities of 650 mAh and 1250 mAh, respectively.

Although all these measures have the same purpose, the principles of operations of these mechanisms and element are different. Accordingly, the time, temperature, and current range required for the operation differs from one means to another. To balance these differences, examination using many test products is often necessary. This makes production development difficult. Also, when a nonaqueous electrolyte secondary battery is charged with a large current of 3 C or more, current interruption is generally done by a PTC. Therefore, it is necessary to pay close attention to optimization of the PTC. Additionally, the dimensions of a PTC is usually limited by the dimensions of a battery, so the optimization of the element is in many instances extremely difficult.

The scope of claims of Jpn. Pat. Appln. KOKAI Publication No. 5-74493 has disclosed a secondary battery with a safety device, comprising a composite metal oxide primarily consisting of Li and Co as a positive electrode active material and a carbonaceous material as a negative electrode active material, wherein a PTC having an operation temperature of 140° C. or less and a sensitive temperature coefficient of −10 to −130 is attached to the secondary battery.

This publication describes that the use of the above PTC can prevent explosion when the battery is charged with a current of about 2 C.

BRIEF SUMMARY OF THE INVENTION

It is an object of the present invention to provide a nonaqueous electrolyte secondary battery whose safety in overcharge, particularly charge with an overcurrent of 3 C or more is improved by improving a PTC.

According to the present invention, there is provided a nonaqueous electrolyte secondary battery comprising:
a positive electrode capable of absorbing/desorbing lithium ions;
a negative electrode capable of absorbing/desorbing lithium ions;
a nonaqueous electrolyte; and
a Positive Thermal Coefficient;
wherein the Positive Thermal Coefficient satisfies expression (1) below:

$$50/P < R \tag{1}$$

where $R$ (mΩ) is a resistance at 25° C. of the Positive Thermal Coefficient and $P$ (Ah) is a nominal capacity of the secondary battery.

According to the present invention, there is provided a nonaqueous electrolyte secondary battery comprising:
a closed-end, cylindrical case having an opening portion;
a positive electrode accommodated in the case and capable of absorbing/desorbing lithium ions;
a negative electrode accommodated in the case and capable of absorbing/desorbing lithium ions;
a separator arranged between the positive electrode and the negative electrode;
a nonaqueous electrolyte contained in the case;
a sealing member arranged in the opening portion of the case and having a Positive Thermal Coefficient,
wherein the Positive Thermal Coefficient satisfies expression (1) below:

$$50/P < R \tag{1}$$

where $R$ (mΩ) is a resistance at 25° C. of the Positive Thermal Coefficient and $P$ (Ah) is a nominal capacity of the secondary battery.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A cylindrical nonaqueous electrolyte secondary battery as an embodiment of a nonaqueous electrolyte secondary battery according to the present invention will be described in detail below with reference to FIG. 1.

A closed-end, cylindrical metal case 1 also serving as, e.g., a negative terminal has a bent portion 2 formed by bending the upper end inward and a step portion 3 formed below the bent portion 2 and projecting inward. The case 1 is mainly consisting of, e.g., mild steel. A portion of the case 1 above the step portion 3 is an opening portion. The case 1 accommodates an electrode group 7 formed by stacking a positive electrode 4, a separator 5, and a negative electrode 6 and spirally winding the resultant structure. A nonaqueous electrolyte is contained in the case 1. An insulating plate 8 is arranged on the bottom of the case 1 and prevents the positive electrode 4 of the electrode group 7 from electrically contacting the case 1 also serving as a negative terminal. The negative electrode 6 of the electrode group 7 and the bottom of the case 1 are connected by a negative electrode lead (not shown). A sealing member 9 comprises a synthetic resin insulating gasket 10, a first cover 11 serving as a terminal, a second cover 12 having an explosion preventing function and a Positive Thermal Coefficient 13. The insulating gasket 10 is a closed-end, cylindrical member and has a circular hole 14 in its bottom. The insulating gasket 10 is mainly consisting of, e.g., polypropylene. The PTC 13 is arranged between the first cover 11 and the second cover 12. The first cover 11, the second cover 12 and the PTC 13 are arranged inside the insulating gasket 10, respectively. The gasket 10 is arranged on the step portion 3 of the case 1. The gasket 10 is compressed against the bent portion 2, the opening portion and the step portion 3. That is, the first cover 11, the second cover 12 and the PTC 13 are fixed by caulking, via the insulating gasket 10, in the internal space of the case 1 surrounded by the bent portion 2 and the step portion 3, respectively.

The second cover 12 comprises a dish-like metal cover 15, a valve film 16, a metal reinforcing plate 17. The cover 15 is made from, e.g., aluminum and arranged to oppose the electrode group 7. The valve film 16 is made from a thin flexible film and arranged on the cover 15. The reinforcing plate 17 is made from, e.g., stainless. The reinforcing plate 17 is set on the valve film 16 and is clamped by an annular portion 18 formed by bending the edge of the cover 15 inward. The PTC 13 is arranged on the annular portion 18 of the cover 15. The PTC 13 has a structure in which ring-like collector units 20a and 20b are stacked on the two surfaces of a ring-like PTC unit 19. The first cover 11 is made from, metal (e.g., stainless) and has a hat shape. The first cover 11 is so arranged that its peripheral edge rests on the collector units 20a of the PTC 13. Gas vent holes 21, 22, 23, and 24 are formed in the cover 15, the reinforcing plate 17, the PTC 13, and the first cover 11, respectively. One end of a positive electrode lead 25 is connected to the positive electrode 4 of the electrode group 7, and the other end is connected to the lower surface of the cover 15 of the sealing member 9.

The positive electrode 4, the negative electrode 6, the separator 5, the nonaqueous electrolyte, and the PTC 13 will be described below.

1) Positive Electrode 4

The positive electrode 4 is manufactured by, e.g., suspending a positive electrode material which absorbs and desorbs lithium ions as an active material, a conducting agent, and a binder in an appropriate solvent, coating a positive electrode collector with the resultant suspension, and drying and pressing the resultant structure.

Examples of the active material are a lithium composite oxide represented by $Li_xMO_2$ wherein M represents one or more types of transition metals, preferably Co and/or Ni, and $0.05 < x < 1.10$, and a lithium composite oxide represented by $Li_xM_2O_4$ wherein M represents one or more types of transition metals, preferably Mn, and $0.05 < x < 1.10$. Practical examples are composite oxides represented by $LiCoO_2$, $LiNiO_2$, $LiMn_2O_4$, and $Li_xNi_yCo_{(1-y)}O_2$ wherein $0.05 < x < 1.10$ and $0 < y < 1$.

Any of these composite oxides can be manufactured by, e.g., mixing carbonates of lithium, cobalt, and nickel, as starting materials, in accordance with the composition, and sintering the mixture in an oxygen atmosphere at 600° C. to 1000° C. The starting materials are not restricted to carbonates, and synthesis can be similarly performed from hydroxides or oxides.

Examples of the conducting agent are acetylene black, carbon black, and graphite.

As the binder, it is possible to use, e.g., polytetrafluoroethylene (PTFE), polyvinylidene flouride (PVDF), an ethylene-propylene-diene copolymer (EPDM), or styrenebutadiene rubber (SBR).

As the collector, it is preferable to use, e.g., an aluminum foil, or a stainless steel foil.

2) Construction of Negative Electrode 5

The negative electrode 5 is manufactured by the following method. That is, the negative electrode 5 is manufactured by suspending a negative electrode material which absorbs and desorbs lithium ions as an active material, and a binder in an appropriate solvent, coating a negative electrode collector with the resultant suspension, and drying and pressing the resultant structure.

Examples of the active material which absorbs and desorbs lithium ions are a carbonaceous material, metal lithium, a lithium alloy, an intermetallic compound, polyacetylene, and polypyrrole.

Examples of the carbonaceous material are pyrolytic carbons, cokes (e.g., pitch coke, needle coke, and petroleum coke), graphites (e.g., natural graphite, artificial graphite, fiber graphite, and spherical graphite), glassy carbons, an organic polymer compound (formed by sintering, e.g., a phenolic resin or a furan resin at a proper temperature), and mesophase pitch-based carbons. The mesophase pitch-based carbons are particularly preferable. Of these mesophase pitch-based carbons, a mesophase pitch-based carbon fiber graphitized at 2500° C. or higher and mesophase spherical carbon graphitized at 2500° C. or higher are favorable. A negative electrode containing such carbon fiber or spherical carbon is preferable because the capacity is increased.

The carbonaceous material has an exothermic peak at preferably 700° C. or higher, and more preferably 800° C. or higher in differential thermal analysis. Also, the intensity ratio $P_{101}/P_{100}$ of the (101) diffraction peak ($P_{101}$) to the (100) diffraction peak ($P_{100}$) of the graphite structure of the carbonaceous material measured by X-ray diffraction is preferably 0.7 to 2.2. A negative electrode containing this carbonaceous material can rapidly absorb and desorb lithium ions. This improves the rapid charge/discharge performance of the secondary battery.

As the binder, it is possible to use, e.g., polytetrafluoroethylene (PTFE), polyvinylidene flouride (PVDF), an ethylene-propylene-diene copolymer (EPDM), styrene-butadiene rubber (SBR), or carboxymethylcellulose (CMC).

As the collector, the use of, e.g., a copper foil, a stainless steel foil, or a nickel foil is preferable.

3) Separator 5

The separator 5 can be formed from, e.g., synthetic resin nonwoven fabric, a polyethylene porous film, or a polypropylene porous film.

4) Nonaqueous Electrolyte

This nonaqueous electrolyte is prepared by dissolving an electrolytic salt (lithium salt) in a nonaqueous solvent.

Examples of the nonaqueous solvent are cyclic carbonates such as ethylenecarbonate (EC) and propylenecarbonate (PC), chain carbonates such as dimethylcarbonate (DMC), methylethylcarbonate (MEC), and diethylcarbonate (DEC), chain ethers such as dimethoxyethane (DME), diethoxyethane (DEE), and ethoxymethoxyethane, cyclic ethers such as tetrahydrofuran (THF) and 2-methyltetrahydrofuran (2-MeTHF), fatty esters such as crown ether and γ-butyrolactone (γ-BL), nitrogen compounds such as acetonitrile (AN), and sulfur compounds such as sulforane (SL) and dimethylsulfoxide (DMSO). These nonaqueous solvents can be used singly or in the form of a mixture of two or more types thereof. It is particularly preferable to use one or more types of materials selected from EC, DMC, DEC and MEC as the nonaqueous solvents. A secondary battery including a nonaqueous electrolyte containing any of these nonaqueous solvents improves in the safety in overcharge.

Examples of the electrolytic salt are lithium salts such as lithium perchlorate ($LiClO_4$), lithium phosphate hexafluoride ($LiPF_6$), lithium borofluoride ($LiBF_4$), arsenic lithium hexafluoride ($LiAsF_6$), lithium trifluoromethanesulfonate ($LiCF_3SO_3$), and bistrifluoromethylsulfonylimidolithium [$LiN(CF_3)SO_2)_2$]. It is particularly preferable to use one or more types of materials selected from $LiPF_6$ and $LiBF_4$ as the electrolytic salts. A secondary battery including a nonaqueous electrolyte containing any of these electrolytic salts improves in the safety in overcharge.

The amount of the electrolytic salt with respect to the nonaqueous solvent is preferably 0.1 mol/l to 3.0 mol/l.

5) PTC 13

The PTC 13 satisfies expression (1) below.

$$50/P < R \qquad (1)$$

where R (mΩ) is the resistance at 25° C. of the PTC and P (Ah) is the nominal capacity of a nonaqueous electrolyte secondary battery including the PTC. The nominal capacity P (Ah) means the theoretical capacity of the secondary battery.

Figure 2:
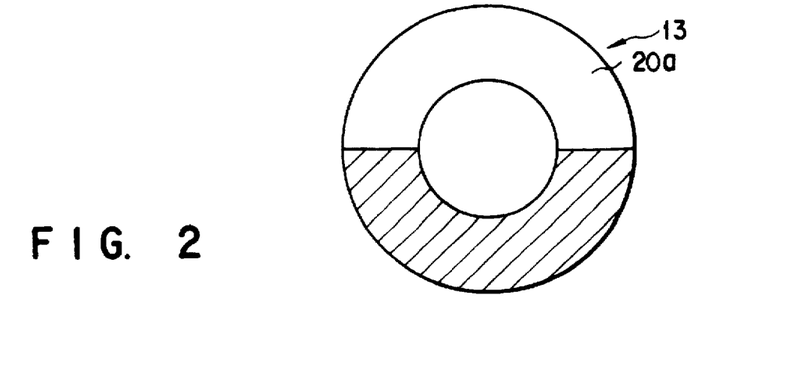
FIG. 2 is a plan view for explaining a method of measuring the resistance at 25° C. of a PTC assembled in the nonaqueous electrolyte secondary battery according to the present invention.

The resistance R (mΩ) means a resistance with respect to a DC current. The resistance R (mΩ) can be measured by a four-wire resistance meter. The PTC is set upright in the resistance meter during the measurement. In the case of a ring-like PTC, as shown in FIG. 2, the measurement point is set in the lower-half portion on both surfaces of the PTC, i.e., a hatched region in FIG. 2. As the four-wire resistance meter, it is preferable to use HP3456A (tradename) manufactured by Hewlett Packard Co. or an equivalent device.

Figure 3:
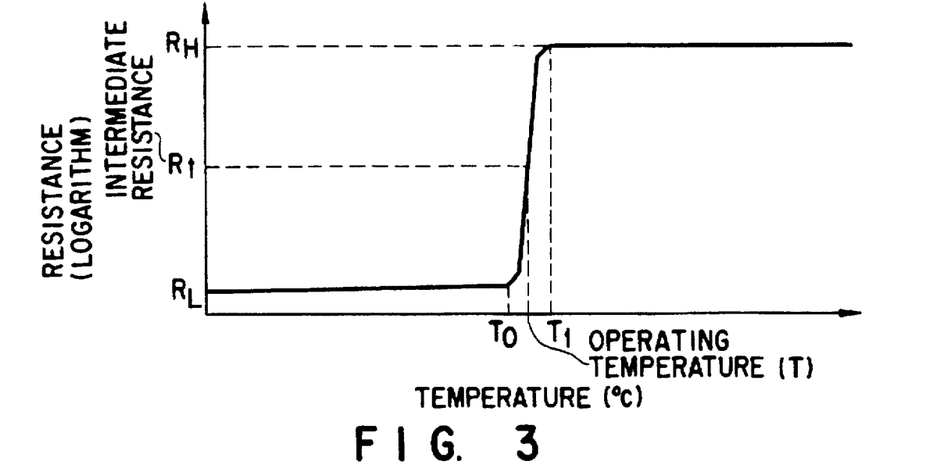
FIG. 3 is a graph showing an example of the relationship between the temperature and the resistance (logarithm) of the PTC assembled in the nonaqueous electrolyte secondary battery according to the present invention.

The PTC has a Positive Thermal Coefficient characteristic (PTC characteristic). FIG. 3 shows an example of the relationship between the temperature and the logarithm of the resistance of this PTC. As shown in FIG. 3, the PTC having the PTC characteristic exhibits a low resistance ($R_L$) until the temperature rises to a certain fixed temperature ($T_0$). When the temperature exceeds this temperature ($T_0$), the resistance increases abruptly. The PTC shows a high resistance ($R_H$) at a temperature $T_1$ or higher and the low resistance ($R_L$) when the temperature again lowers to the previous temperature ($T_0$). The temperature at which the resistance of the PTC reaches a medium resistance (Rt) between the low resistance ($R_L$) and the high resistance ($R_H$) is called an operating temperature T (°C.).

The operating temperature T (°C.) is preferably 70 to 150 for the reasons explained below. If the operating temperature T is lower than 70° C., the PTC may operate to stop the function of the secondary battery although there is no abnormal generation of heat in the battery. If the operating temperature T exceeds 150° C., it sometimes becomes difficult to suppress the temperature rise or the internal pressure rise upon overcharge. This may lead to explosion or ignition. Even if neither explosion nor ignition occurs, the secondary battery is repetitively exposed to high temperatures whenever overcharged. Consequently, it is highly possible that the positive electrode or the negative electrode thermally deteriorates. The operating temperature T (°C.) is more preferably 80 to 130.

The PTC unit of the PTC can be formed from, e.g., ceramics or a conductive polymer having the PTC characteristic. The conductive polymer is particularly preferable in order to avoid damages such as cracks in the PTC when the sealing member is fixed by caulking.

The PTC unit containing this conductive polymer can be manufactured by mixing proper amounts of conductive carbon and a polymer, such as a polyolefin or a fluorine resin, which repetitively expands and contracts due to temperature changes, and radiation-crosslinking the mixture. In a normal state, this PTC shows a low resistance because the carbon dispersed in the polymer forms a conduction path. When the temperature exceeds the melting point of the polymer, volume expansion of the polymer takes place and breaks the conduction path formed by the carbon. Consequently, the PTC shows a high resistance. When the temperature again lowers, the polymer solidifies to form the conduction path of the carbon, and the PTC exhibits a low resistance. An example of the PTC having such a PTC unit is a PTC of LTP Series (tradename) manufactured by Raychem Co. The resistance change of this PTC is $10^4$ to $10^6$ times.

The collector unit of the above PTC can be formed from, e.g., nickel.

The present inventors have analyzed the operating mechanism of a PTC when charge is performed with a large current of 3 C or more, and found that a nonaqueous electrolyte secondary battery including a PTC meeting expression (1) presented earlier improves in the safety in overcharge, particularly charge with a large current of 3 C or more.

That is, it turns out that the operating mechanism of a PTC when charge is performed with a large current of 3 C or more has characteristic features (a) to (d) below.

(a) When the charge is performed, the battery temperature gradually rises in the early stages and abruptly rises when a certain charge amount is exceeded.

(b) The PTC is heated by heat generated by the electrode group in the battery case and by self-heating due to the supplied current. This raises the temperature to a temperature at which the resistance abruptly rises.

(c) When the nonaqueous electrolyte secondary battery is charged with a large current, the amount of heat generated by the electrode group in the case is generally much larger than the amount of heat generated by the PTC. However, the heat generated by the electrode group is conducted to the PTC after being conducted to various battery components such as the case. Accordingly, the effect of this heat on the temperature rise of the PTC is smaller than the effect of the self-heating of the element.

(d) As the battery size increases, it becomes easier to secure the safety even when the operation of the PTC is slow.

From these findings, it turns out that to allow the PTC to rapidly operate under abnormal conditions such as overcharge, setting a structure or a condition in which the PTC itself can efficiently generate heat is more effective than making the conventionally advised structure in which heat generated by the electrode group in the battery case is efficiently conducted to the PTC.

The self-heating of the PTC is due to Joule's heat resulting from Ohm's loss caused by the supplied current, so the PTC impedance is expected to have a large influence. Assuming that the resistance at 25° C. of the PTC is R (mΩ) and the supplied current is I (A), the self-heating of the PTC is represented by expression (I) below.

$$I^2 \cdot R \tag{I}$$

Heat generated by the electrode group in the overcharge region is proportional to the supplied current I (A) as indicated by expression (II) below assuming that the battery voltage during the overcharge and the chemical reaction amount produced in the battery by the overcharge are almost fixed.

$$I \cdot K_0 \tag{II}$$

In expression (II), $K_0$ is a constant for converting the supplied current into the amount of heat.

Of the amounts of heat calculated by expressions (I) and (II) above, a portion conducted to the PTC to bring about a temperature rise of the PTC is assumed to induce the operation of the PTC. This amount can be represented by expression (III) below.

$$I^2 \cdot R \cdot K_1 + I \cdot K_2 \tag{III}$$

In expression (III), $K_1$ is a constant for calculating the amount of heat generated in the reaction represented by expression (I) and accumulated in the PTC. $K_2$ is a value obtained by multiplying the constant $K_0$ in expression (II) by the heat transfer coefficient between the electrode group in the case and the PTC.

It is considered that the contribution of the second term ($I \cdot K_2$) in expression (III) is small as described in characteristic feature (c).

Assume that the PTC operates when the amount of heat generation calculated by expression (III) reaches a certain fixed value and that this fixed value is $K_3$. Also, the empirical rule explained in characteristic feature (d) is taken into consideration; that is, the fact that as the battery capacity increases it becomes easier to secure the safety even when the operation of the PTC is slow is taken into account. Since this fixed value $K_3$ is proportional to the nominal capacity P (Ah) of the battery, expression (IV) below holds.

$$I^2 \cdot R \cdot K_1 + I \cdot K_2 > K_3 \cdot P \tag{IV}$$

Expressing the charging/discharging current by C rate facilitates examining the charge/discharge characteristics of a battery since it is unnecessary to take account of the difference in battery capacity. Therefore, C rate expression is introduced to expression (IV). 1 C is a current value by which the battery nominal capacity can be charged or discharged in one hour, so 1 C equals 1 P. Accordingly, expression (IV) is rewritten as follows.

$$P^2 \cdot R \cdot K_1 + P \cdot K_2 > K_3 \cdot P \tag{V}$$

Expression (V) can be rewritten into expression (VI) below by transposing the terms and arranging the constants into common constants.

$$R > K/P \tag{VI}$$

In expression (VI), K is the common constant of the constants $K_1$ to $K_3$ {$K=(K_3-K_2)/K_1$}.

The present inventors have found that the safety in overcharge, particularly charge with 3 C or more can be improved by the use of a PTC satisfying expression (VI), i.e., the use of a PTC whose resistance R (mΩ) at 25° C. is larger than the value obtained by dividing the constant K by the battery nominal capacity P (Ah).

Also, the present inventors have found that the optimum value of the constant K is 50 by examining the values of $K_1$ to $K_3$ and checking the phenomenon in overcharge of a secondary battery including a PTC whose resistance R (mΩ) is K/P or less. That is, when the resistance R (mΩ) at 25° C. is 50/P or less, the self-heating of the PTC due to the supplied current reduces in overcharge, particularly charge with a large current of 3 C or more. This prolongs the time required for the PTC to interrupt the current. Consequently, a chemical reaction resulting from the overcharge proceeds in the battery to raise the battery temperature and the battery internal pressure. This can cause a leak of the electrolyte from the sealed portion or ignition. When the resistance R (mΩ) is larger than 50/P, the self-heating of the PTC can be accelerated in overcharge, particularly charge with 3 C or more. This allows the PTC to rapidly operate to interrupt the current path in the secondary battery. Consequently, it becomes possible to prevent an excess temperature rise or internal pressure rise.

To further improve the safety, the resistance R (mΩ) is preferably larger than 70/P. However, if the resistance R (mΩ) is 167/P or larger, the voltage drop during discharge may significantly increase owing to the presence of a high-resistance PTC. This voltage drop leads to, e.g., problems explained below.

That is, when a nonaqueous electrolyte secondary battery including a PTC with a high resistance as described above is incorporated into a portable electronic apparatus such as a cellular phone or a personal computer and discharged with a large current (e.g., 3 C), the discharge voltage significantly drops due to the presence of the PTC. Assuming that a PTC having a resistance of 167/P is used for a secondary battery, the magnitude of the voltage drop becomes about 0.5V. When this secondary battery is discharged with a large current 3 C, the average terminal voltage becomes a value obtained by subtracting 0.5V from 3.5V, i.e., 3V. As a result, although the capacity of the battery remains, the terminal voltage of the battery becomes lower than the operating voltage (e.g., 3V) of an overdischarge inhibiting circuit of the portable electronic apparatus, so the circuit operates. Consequently, the battery can no longer be discharged even though the capacity remains, and the discharge capacity decreases accordingly. 98% of portable electronic apparatuses as main applications of small-sized nonaqueous electrolyte secondary batteries for consumers are used with 3 C or less, and 80% or more of them are used with 1 C or less. Also, the operating voltages of many overdischarge inhibiting circuits incorporated into these portable electronic apparatuses are set to near 3V. Accordingly, by setting the upper limit of the resistance of the PTC to 167/P, discharge with a large current is not erroneously detected as overdischarge, and discharge will not be interrupted, thereby preventing the discharge capacity decreases. In particular, when a secondary battery is incorporated in a portable electronic apparatus in which the operating voltage of an overdischarge inhibiting circuit is set to near 3V, and is discharged with a large current such as 3 C, a decrease in discharge capacity can be prevented. To further improve the large-current discharge characteristics, the resistance R (mΩ) is preferably smaller than 120/P. In particular, to further improve the safety while maintaining excellent large-current discharge characteristics, the use of a PTC meeting expression (2) below is preferable.

$$70/P<R<120/P \quad (2)$$

Note that expression (VI) presented earlier is introduced on the basis of the assumption that the self-heating of the PTC contributes to the operation of the PTC at a desired ratio, as explained above in the expression introduction process. A large-sized nonaqueous electrolyte secondary battery with a nominal capacity of 40 Ah or more for use in an electric automobile has a small surface area compared to the battery capacity. If the electrode group in the case generates heat due to overcharge, the heat near the center of the electrode group accumulates without being released or radiated to the outside, and the PTC is heated by this heat. It is, therefore, considered that the PTC is heated to a temperature at which the PTC shows a high resistance, before the PTC generates heat for itself or slightly after this self-heating occurred. That is, it is surmised that in a large-sized nonaqueous electrolyte secondary battery, the contribution of the heat generation of the electrode group to the operation of a PTC is much larger than the contribution of the self-heating of the PTC. Even if a low-resistance PTC is used in place of a PTC satisfying expression (1) which takes account of the contribution of the self-heating of a PTC, the safety in overcharge can often be assured.

Accordingly, the nominal capacity P (Ah) of the secondary battery is preferably 0.5 to 5 Ah. In a nonaqueous electrolyte secondary battery having a nominal capacity within this range, heat generated by the electrode group in the case due to overcharge is properly released to the outside, and the self-heating of the PTC contributes to the operation of the PTC at a high ratio. As a consequence, a high safety can be secured by the use of a PTC meeting expression (1). The nominal capacity P (Ah) is more preferably 0.5 to 3 Ah.

When a stacked structure manufactured by alternately stacking a positive electrode and a negative electrode with a separator interposed between them is used as an electrode group, the thickness of the structure is preferably set between 0.5 and 4 cm. Also, when a structure manufactured by spirally winding a positive electrode and a negative electrode with a separator interposed between them is used as an electrode group, the diameter of the structure is preferably set between 0.5 and 4 cm. In a nonaqueous electrolyte secondary battery including an electrode group having this thickness or diameter, heat generated by the electrode group due to overcharge can be properly released to the outside. Therefore, a high safety can be secured by the use of a PTC meeting expression (1).

As has been described above, a nonaqueous electrolyte secondary battery according to the present invention includes a PTC whose resistance R (mΩ) at 25° C. satisfies expression (1) below.

$$50/P<R \quad (1)$$

In expression (1), P (Ah) indicates the nominal capacity of the nonaqueous electrolyte secondary battery having the above PTC.

When this secondary battery is overcharged, especially when the battery is charged with 3 C or more, the amount of heat generated by the PTC itself due to the charging current can be increased. This allows the temperature of the PTC to rise to the operating temperature within a short time period. Consequently, the current path of the secondary battery can be interrupted by the PTC while the temperature of the secondary battery is kept relatively low. Accordingly, it is possible to prevent an excess temperature rise or internal pressure rise and improve the safety.

Also, when the PTC satisfies expression (2) below, $$50/P<R<167/P \quad (2)$$

it is possible to improve the safety in overcharge. At the same time, it is possible to prevent a large-current discharge from being interrupted.

Figure 1:
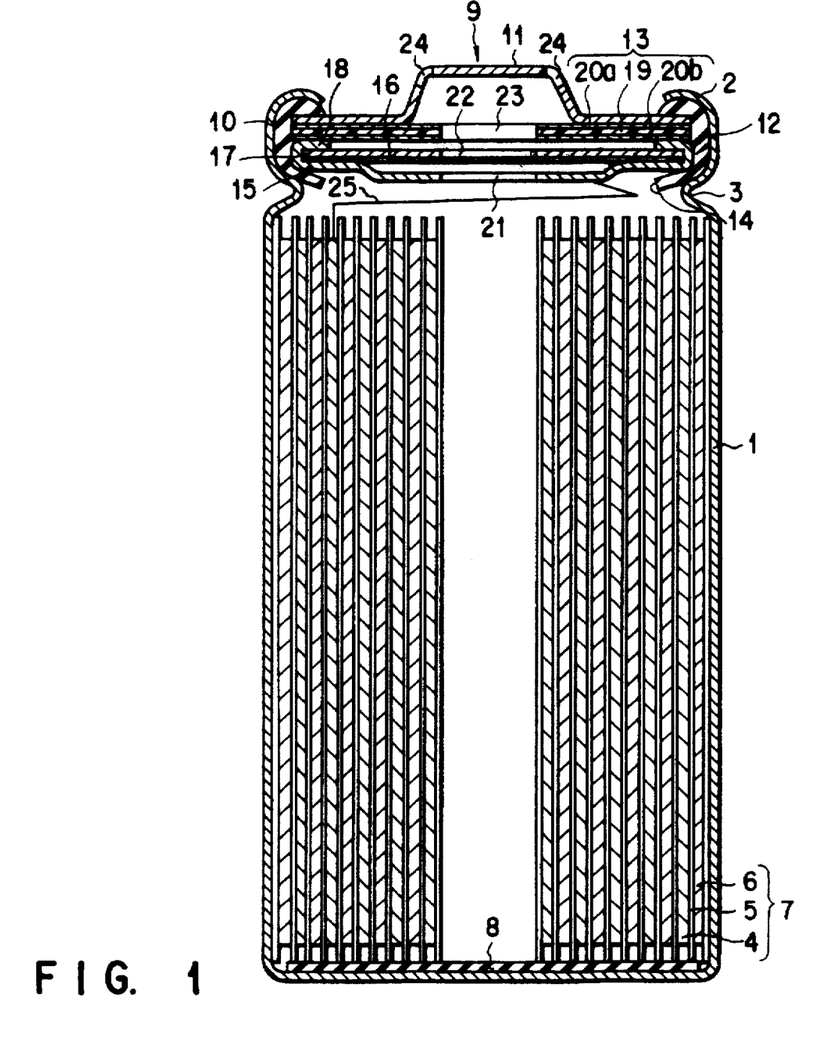
FIG. 1 is a sectional view showing an embodiment of a nonaqueous electrolyte secondary battery according to the present invention.
Figure 4:
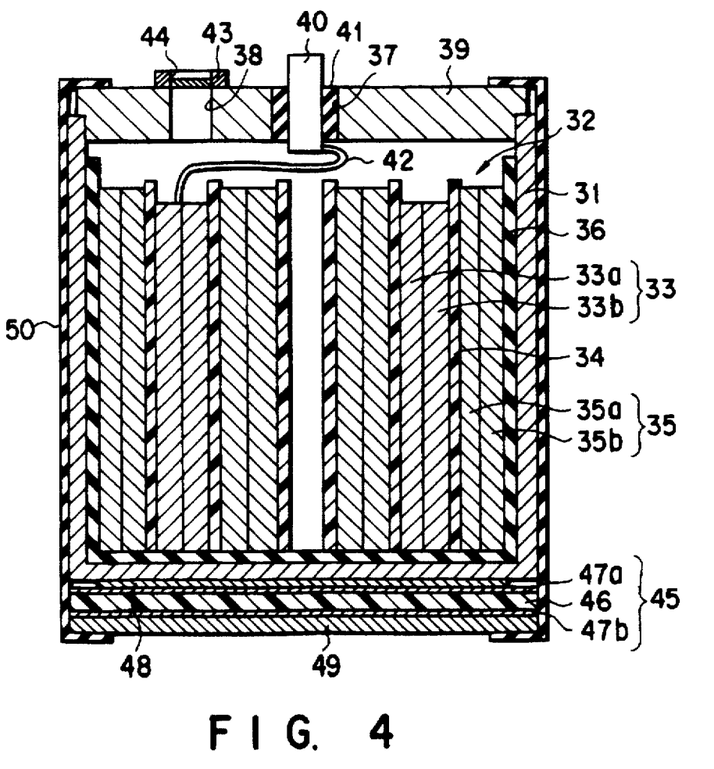
FIG. 4 is a sectional view showing another embodiment of the nonaqueous electrolyte secondary battery according to the present invention.

Note that in FIG. 1 explained earlier, the nonaqueous electrolyte secondary battery according to the present invention is applied to a cylindrical nonaqueous electrolyte secondary battery. However, the nonaqueous electrolyte secondary battery according to the present invention is similarly applicable to a rectangular structure. This embodiment is shown in FIG. 4. A closed-end, rectangular case 31 made from, e.g., mild steel and also serving as a negative terminal accommodates an electrode group 32. This electrode group 32 is manufactured by spirally winding a stacked structure of a positive electrode 33, a separator 34, and a negative electrode 35. The electrode group 32 is housed in a basket-like electrode cover 36. A nonaqueous electrolyte is contained in the case 31. The positive electrode 33 has a structure in which a positive electrode layers 33a and 33b are formed on the two surfaces of a positive electrode collector. This positive electrode 33 can be manufactured by, e.g., coating the two surfaces of the collector 33a and 33b with a suspension containing the above-mentioned positive electrode material, and drying and pressing the resultant structure. The negative electrode 35 has a structure in which a negative electrode layers 35a and 35b are formed on the two surfaces of a negative electrode collector. This negative electrode 35 can be manufactured by, e.g., coating the two surfaces of the collector with a suspension containing the above-mentioned negative electrode material, and drying and pressing the resultant structure.

A sealing member 39 which is made from, e.g., mild steel and in which a circular hole 37 is formed in the center and a rectangular pressure release hole 38 is formed adjacent to the hole 37 is airtightly attached to the upper opening of the case 31 by laser welding. A positive terminal pin 40 made from, e.g., high chrome steel is inserted into the hole 37 of the sealing member 39 so that the upper and lower ends of the pin 40 protrude from the upper and lower surfaces of the sealing member 39. The positive terminal pin 40 is also hermetically sealed by a glass insulating member 41 filled in the hole 37. The positive terminal pin 40 is connected to the positive electrode 33 of the electrode group 32 by a lead 42.

A thin rectangular plate 43 made from, e.g., stainless steel is airtightly attached by laser welding to the upper surface of the sealing member 39 so as to close the pressure release hole 38. A cut groove 44 having a straight portion with V-shaped ends is formed in the thin plate 43. A PTC 45 has a structure in which rectangular, plate-like collector units 47a and 47b are stacked on the two surfaces of a rectangular, plate-like PTC unit 46. This PTC 45 is fixed to the bottom of the case 31 via a band-like nickel connecting tab 48. A rectangular negative terminal plate 49 made from, e.g., stainless steel is attached to the lower surface of the collector unit 47b of the PTC element 45. A jacket tube 50 made from a heat-shrinkable resin covers the outer circumferential surfaces of the case 31, the edges of the bottom surface of the case 31, and the edges of the upper surface of the sealing member 39.

In FIG. 4, the PTC element is arranged on the bottom of the case. However, the PTC element can also be arranged on a side surface of the case.

The present invention will be described in detail below by way of its examples with reference to FIG. 1.

EXAMPLE 1

<Manufacture of Negative Electrode>

87 wt % of MCF (Mesophase Carbon Fiber) as fiber graphite, 10 wt % of conductive graphite as a conductive agent, 1.7 wt % of styrenebutadiene rubber as a binder, and 1.3 wt % of carboxymethylcellulose as a binder were kneaded by using water as a solvent. A copper foil was coated with the resultant paste, and the resultant material was dried and pressed to form a negative electrode.

<Manufacture of Positive Electrode>

97.6 wt % of a lithium cobalt oxide ($LiCoO_2$) powder, 1.2 wt % of acetylene black, 1.2 wt % of graphite, 2 wt % of a fluorocarbon rubber, and a solvent mixture of ethyl acetate and ethyl cellosolve were mixed. An aluminum foil was coated with the resultant mixture, and the resultant material was dried and pressed to form a positive electrode.

A porous polyethylene separator was interposed between the obtained positive and negative electrodes, and the resultant structure was spirally wound to manufacture an electrode group 16 mm in diameter.

<Manufacture of Sealing Member>

A PTC (LTP Series (tradename); manufactured by Raychem Co.) having a ring-like shape as shown in FIGS. 1 and 2 was prepared. This PTC had an outside diameter of 14.5 mm, an inside diameter of 6 mm, a resistance R of 78 mΩ at 25° C., and an operating temperature T of 110° C. Note that the resistance R at 25° C. of the PTC was measured by using a four-wire resistance meter HP3456A (tradename) manufactured by Hewlett Packard Co. The PTC was set upright in the resistance meter during the measurement. The measurement point was set in the lower half portion on both surfaces of the PTC. This PTC was used to assemble a sealing member having the structure shown in FIG. 1 and serving as both an explosion preventing member and a positive terminal.

<Assembly of Battery>

The electrode group was accommodated in a closed-end, cylindrical case 17 mm in diameter and 50 mm in height made from nickel-plated mild steel. A solution prepared by dissolving 1 mol/l of $LiPF_6$ in a solvent mixture of ethylenecarbonate and methylethylcarbonate was contained as a nonaqueous electrolyte in the case. The first cover, the PTC and the second cover were fixed by caulking to the opening portion of the case via the insulating gasket respectively, thereby manufacturing a 17500 type cylindrical lithium-ion secondary battery having the structure shown in FIG. 1 and a nominal capacity of 650 mAh.

EXAMPLE 2

A cylindrical lithium-ion secondary battery was manufactured following the same procedure as in Example 1 except that the resistance R of the PTC was set to 100 mΩ.

COMPARATIVE EXAMPLE 1

A cylindrical lithium-ion secondary battery was manufactured following the same procedure as in Example 1 except that the resistance R of the PTC was set to 23 mΩ.

COMPARATIVE EXAMPLE 2

A cylindrical lithium-ion secondary battery was manufactured following the same procedure as in Example 1 except that the resistance R of the PTC was set to 41 mΩ.

COMPARATIVE EXAMPLE 3

A cylindrical lithium-ion secondary battery was manufactured following the same procedure as in Example 1 except that the resistance R of the PTC was set to 64 mΩ.

The obtained secondary batteries of Examples 1 and 2 and Comparative Examples 1 to 3 were left to stand for two days after being assembled. Thereafter, each battery was initially charged for a total of five hours such that the battery was charged with a constant current of 1 C until the battery voltage became 4.2V and charged with a constant voltage of 4.2V after the battery voltage reached 4.2V.

The secondary batteries of Examples 1 and 2 and Comparative Examples 1 to 3 thus initially charged were subjected to overcharge tests by performing constant current charge by using currents of 3 C (1.95 A), 4 C (2.6 A), and 5 C (3.25 A). Evaluation was performed by using three criteria: o, the PTC operated to safely stop the battery function without changing the outer appearance; Δ, the electrolyte leaked from the sealed portion before the PTC operated; and x, the battery ignited before the PTC operated. The results are shown in TABLE 1 to be presented later.

EXAMPLE 3

<Manufacture of Negative Electrode>

87 wt % of MCF (Mesophase Carbon Fiber) as fiber graphite, 10 wt % of conductive graphite as a conductive agent, 1.7 wt % of styrenebutadiene rubber as a binder, and 1.3 wt % of carboxymethylcellulose as a binder were kneaded by using water as a solvent. A copper foil was coated with the resultant paste, and the resultant material was dried and pressed to form a negative electrode.

<Manufacture of Positive Electrode>

97.6 wt % of a lithium cobalt oxide ($LiCoO_2$) powder, 1.2 wt % of acetylene black, 1.2 wt % of graphite, 2 wt % of a fluorocarbon rubber, and a solvent mixture of ethyl acetate and ethyl cellosolve were mixed. An aluminum foil was coated with the resultant mixture, and the resultant material was dried and pressed to form a positive electrode.

A porous polyethylene separator was interposed between the obtained positive and negative electrodes, and the resultant structure was spirally wound to manufacture an electrode group 17 mm in diameter.

<Manufacture of Sealing Member>

A PTC (LTP Series (tradename); manufactured by Raychem Co.) having a ring-like shape as shown in FIGS. 1 and 2 was prepared. This PTC had an outside diameter of 15.5 mm, an inside diameter of 7.5 mm, a resistance R of 42 m$\Omega$ at 25° C., and an operating temperature T of 100° C. Note that the resistance R at 25° C. of the PTC was measured following the same procedure as described above. This PTC was used to assemble a sealing member having the structure shown in FIG. 1 and serving as both an explosion preventing member and a terminal.

<Assembly of Battery>

The electrode group was accommodated in a closed-end, cylindrical case 18 mm in diameter and 65 mm in height made from nickel-plated mild steel. A nonaqueous electrolyte having the same composition as in Example 1 was also contained in the case. The first cover, the PTC and the second cover were fixed by caulking to the opening portion of the case via an insulating gasket respectively, thereby manufacturing a 18650 type cylindrical lithium-ion secondary battery having the structure shown in FIG. 1 and a nominal capacity of 1250 mAh.

EXAMPLE 4

A cylindrical lithium-ion secondary battery was manufactured following the same procedure as in Example 3 except that the resistance R of the PTC was set to 57 m$\Omega$.

EXAMPLE 5

A cylindrical lithium-ion secondary battery was manufactured following the same procedure as in Example 3 except that the resistance R of the PTC was set to 78 m$\Omega$.

EXAMPLE 6

A cylindrical lithium-ion secondary battery was manufactured following the same procedure as in Example 3 except that the resistance R of the PTC was set to 90 m$\Omega$.

COMPARATIVE EXAMPLE 4

A cylindrical lithium-ion secondary battery was manufactured following the same procedure as in Example 3 except that the resistance R of the PTC was set to 12 m$\Omega$.

COMPARATIVE EXAMPLE 5

A cylindrical lithium-ion secondary battery was manufactured following the same procedure as in Example 3 except that the resistance R of the PTC was set to 31 m$\Omega$.

The obtained secondary batteries of Examples 3 to 6 and Comparative Examples 4 and 5 were left to stand for two days after being assembled. Thereafter, each battery was initially charged following the same procedure as described above.

The secondary batteries of Examples 3 to 6 and Comparative Examples 4 and 5 thus initially charged were subjected to overcharge tests by performing constant current charge by using currents of 3 C (3.75 A), 4 C (5 A), and 5 C (6.25 A). Evaluation was performed by using three criteria: o, the PTC operated to safely stop the battery function without changing the outer appearance; $\Delta$, the electrolyte leaked from the sealed portion before the PTC operated; and x, the battery ignited before the PTC operated. The results are shown in TABLE 2 below.

TABLE 1

| | {50/P = 76.9 (m $\Omega$)} | | | |
|---|---|---|---|---|
| | resistance R (m $\Omega$) | 3C (1.95A) Overcharge | 4C (2.6A) Overcharge | 5C (3.25A) Overcharge |
| Comparative Example 1 | 23 | X | X | $\Delta$ |
| Comparative Example 2 | 41 | $\Delta$ | $\Delta$ | O |
| Comparative Example 3 | 64 | $\Delta$ | O | O |
| Example 1 | 78 | O | O | O |
| Example 2 | 100 | O | O | O |

TABLE 2

| | {50/P = 40 (m $\Omega$)} | | | |
|---|---|---|---|---|
| | resistance R (m $\Omega$) | 3C (3.75A) Overcharge | 4C (5.00A) Overcharge | 5C (6.25A) Overcharge |
| Comparative Example 4 | 12 | X | X | $\Delta$ |
| Comparative Example 5 | 31 | X | X | O |
| Example 3 | 42 | O | O | O |
| Example 4 | 57 | O | O | O |
| Example 5 | 78 | O | O | O |
| Example 6 | 90 | O | O | O |

The resistance R (m$\Omega$) at 25° C. of the PTC of each of the secondary batteries of Examples 1 and 2 and Comparative Examples 1 to 3 will be examined below. The nominal capacity P of these secondary batteries is 0.65 Ah. Accordingly, the safety of these secondary batteries in overcharge can be improved by setting the resistance R at 25° C. of the PTC to larger than 50/0.65, i.e., 76.9 m$\Omega$. As is apparent from TABLE 1, in the secondary batteries of Examples 1 and 2 including the PTC having resistances R larger than 76.9 m$\Omega$, i.e., meeting expression (1), R>50/P, the safety in charge with an overcurrent of 3 C or more can be secured. Conversely, in the secondary batteries of Comparative Examples 1 to 3 including the PTC having resistances R of 76.9 m$\Omega$ or less, i.e., 50/P (m$\Omega$) or less, the electrolyte leaks from the sealed portion or ignition occurs before the PTC operates.

The resistance R (m$\Omega$) at 25° C. of the PTC of each of the secondary batteries of Examples 3 to 6 and Comparative Examples 4 and 5 will be examined below. The nominal capacity P of these secondary batteries is 1.25 Ah. Accordingly, the safety of these secondary batteries in overcharge can be improved by setting the resistance R at 25° C. of the PTC to larger than 50/1.25, i.e., 40 m$\Omega$. As is apparent from TABLE 2, in the secondary batteries of Examples 3 to 6 including the PTC having resistances R larger than 40 m$\Omega$, i.e., meeting expression (1), R>50/P, the safety in overcharge with an overcurrent of 3 C or more can be secured. Conversely, in the secondary batteries of Comparative Examples 4 and 5 including the PTC having resistances R of 50/P (mΩ) or less, the electrolyte leaks from the sealed portion or ignition occurs before the PTC operates.

It is therefore evident from TABLES 1 and 2 that in a nonaqueous electrolyte secondary battery including a PTC satisfying expression (1), explosion or ignition can be avoided in charge with an overcurrent of 3 C or more regardless of the dimensions of the battery.

EXAMPLE 7

A cylindrical lithium-ion secondary battery was manufactured following the same procedure as in Example 3 except that the resistance R of the PTC was set to 130 mΩ.

EXAMPLE 8

A cylindrical lithium-ion secondary battery was manufactured following the same procedure as in Example 3 except that the resistance R of the PTC was set to 152 mΩ.

EXAMPLE 9

A cylindrical lithium-ion secondary battery was manufactured following the same procedure as in Example 3 except that the resistance R of the PTC was set to 185 mΩ.

Each of the obtained secondary batteries of Examples 7 to 9 and the secondary batteries of Examples 4 and 6 described above was incorporated into a portable electronic apparatus in which an overcharge inhibiting circuit was set at 3V, and the discharge capacity was measured by discharging the battery with 3 C (3750 mA). The results are shown in TABLE 3 below.

TABLE 3

{167/P = 133.6 (m Ω)}

| resistance R | Average voltage (V) | Discharge capacity (mAh) |
| --- | --- | --- |
| Example 4 (57 m Ω) | 3.37 | 1248 |
| Example 6 (90 m Ω) | 3.24 | 1254 |
| Example 7 (130 m Ω) | 3.11 | 1241 |
| Example 8 (152 m Ω) | 2.95 | 1048 |
| Example 9 (185 m Ω) | 2.90 | 798 |

As can be seen from TABLE 3, each of the secondary batteries of Examples 4, 6, and 7 including the PTC having resistances R at 25° C. of less than 167/P (mΩ), i.e., less than 133.6 mΩ calculated by substituting P=1.25 Ah into 167/P (mΩ) has a high average discharge voltage and a large discharge capacity. In each of the secondary batteries of Examples 8 and 9 including the PTC having resistances of 167/P (mΩ) or more, the average discharge voltage when 3 C discharge is performed is lower than 3 V, the operating voltage of the overcharge inhibiting circuit. Consequently, the overdischarge inhibiting circuit operates in the last stages of discharge to result in a lower discharge capacity than in Examples 4, 6, and 7. Therefore, it is apparent from TABLES 2 and 3 that in the secondary batteries of Examples 3 to 7 including the PTC meeting 50/P<R<167/P, the safety in overcharge can be improved. At the same time, the last stages of the large current discharge is not erroneously detected as overdischarge.

As has been described in detail above, the nonaqueous electrolyte secondary battery of the present invention includes a PTC whose resistance R (mΩ) at 25° C. satisfies 50/P<R, and thereby achieves remarkable effects of, e.g., avoiding explosion or ignition in overcharge, particularly charge with an overcurrent of 3 C or more.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

I claim:

1. A nonaqueous electrolyte secondary battery comprising:

a positive electrode capable of absorbing/desorbing lithium ions;

a negative electrode capable of absorbing/desorbing lithium ions;

a nonaqueous electrolyte; and a Positive Thermal Coefficient, wherein said Positive Thermal Coefficient satisfies expression (1) below:

$$50/P<R \quad (1)$$

where R (mΩ) is a resistance at 25° C. of said Positive Thermal Coefficient and P (Ah) is a nominal capacity of said secondary battery.

2. A secondary battery according to claim 1, wherein said Positive Thermal Coefficient satisfies expression (2) below $$50/P<R<167/P \quad (2).$$

3. A secondary battery according to claim 1, wherein said Positive Thermal Coefficient satisfies expression (3) below $$70/P<R<120/P \quad (3).$$

4. A secondary battery according to claim 1, wherein an operating temperature of said Positive Thermal Coefficient is 70° C. to 150° C.

5. A secondary battery according to claim 1, wherein the nominal capacity P is 0.5 Ah to 5 Ah.

6. A secondary battery according to claim 1, wherein said positive electrode contains at least one type of an oxide selected from the group consisting of a lithium composite oxide represented by $Li_xMO_2$ wherein M represents at least one type of a transition metal and 0.05<x<1.10 and a lithium composite oxide represented by $Li_xM_2O_4$ wherein M represents at least one type of a transition metal and 0.05<x<1.10.

7. A secondary battery according to claim 1, wherein said negative electrode contains a mesophase pitch-based carbonaceous material.

8. A secondary battery according to claim 1, wherein said nonaqueous electrolyte comprises a nonaqueous solvent and an electrolytic salt dissolved in said nonaqueous solvent, and said nonaqueous solvent contains at least one type of a solvent selected from the group consisting of ethylenecarbonate, propylenecarbonate, dimethylcarbonate, methylethylcarbonate, diethylcarbonate, dimethoxyethane, diethoxyethane, tetrahydrofuran, 2-methyltetrahydrofuran, γ-butyrolactone, acetonitrile, sulforane and dimethylsulfoxide.

9. A secondary battery according to claim 8, wherein said electrolytic salt contains at least one type of a compound selected from the group consisting of $LiClO_4$, $LiPF_6$, $LiBF_4$, $LiAsF_6$, $LiCF_3SO_3$, and $LiN(CF_3)SO_2)_2$.

10. A nonaqueous electrolyte secondary battery comprising:
- a closed-end, cylindrical case having an opening portion;
- a positive electrode accommodated in said case and capable of absorbing/desorbing lithium ions;
- a negative electrode accommodated in said case and capable of absorbing/desorbing lithium ions;
- a separator arranged between said positive electrode and said negative electrode;
- a nonaqueous electrolyte contained in said case; and
- a sealing member arranged in the opening portion of said case and having a Positive Thermal Coefficient, wherein said Positive Thermal Coefficient satisfies expression (1) below:

$$50/P < R \tag{1}$$

where R (m$\Omega$) is a resistance at 25° C. of said Positive Thermal Coefficient and P (Ah) is a nominal capacity of said secondary battery.

11. A secondary battery according to claim 10, wherein said sealing member comprises a first cover serving as a terminal and a second cover, and said Positive Thermal Coefficient is arranged between said first cover and said second cover.

* * * * *